Dec. 19, 1967
M. A. GROENKE
3,358,777
DOLLY WHEEL HITCH
Filed July 2, 1965
2 Sheets-Sheet 1
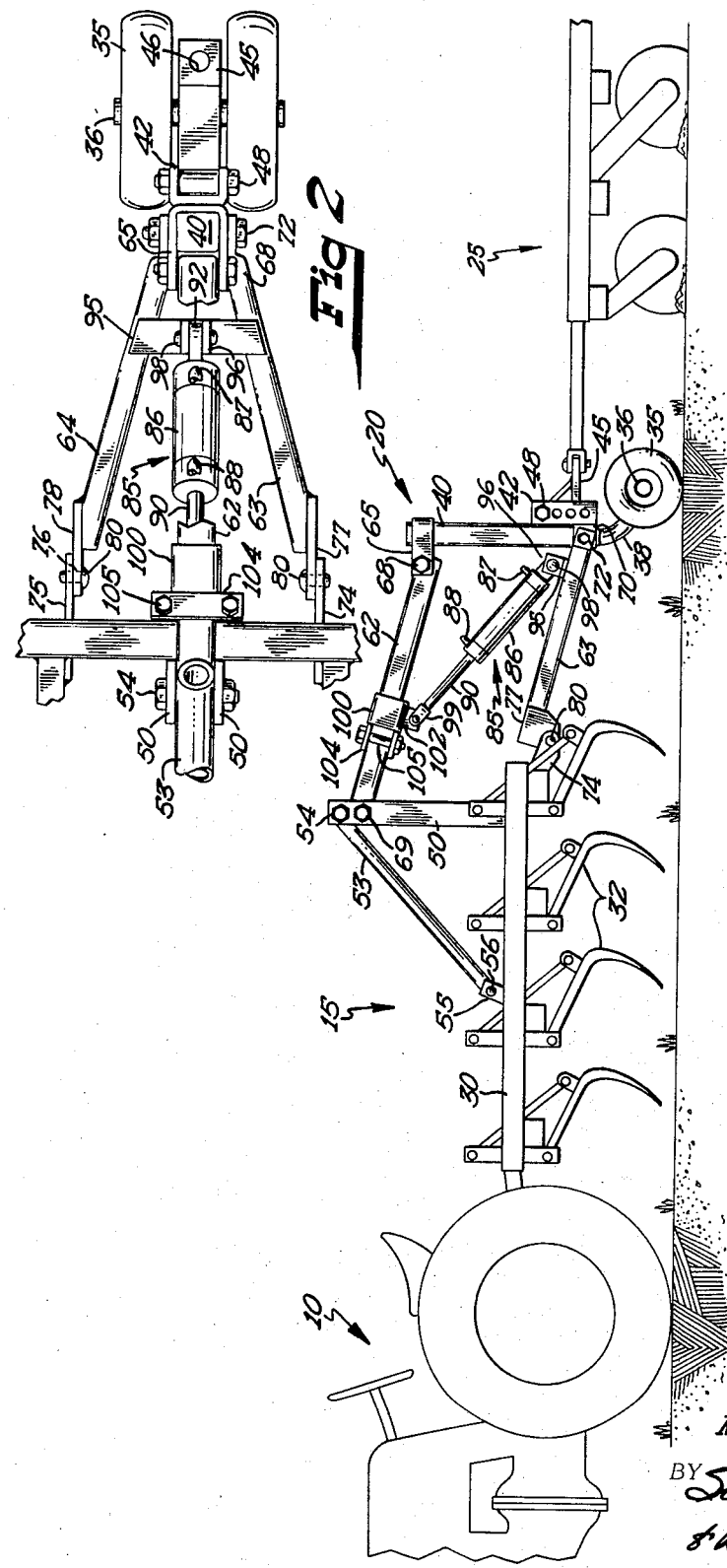
INVENTOR.
MERLIN A. GROENKE
BY Schroeder, Siegfried
& Ryan ATTORNEYS

United States Patent Office 3,358,777
Patented Dec. 19, 1967

3,358,777
DOLLY WHEEL HITCH
Merlin A. Groenke, Glencoe, Minn., assignor to Portable Elevator Manufacturing Company, Bloomington, Ill., a corporation of Illinois
Filed July 2, 1965, Ser. No. 469,133
3 Claims. (Cl. 172—417)

ABSTRACT OF THE DISCLOSURE

This invention relates to a tandem implement dolly having a motive means associated therewith for elevating cultivating apparatus with which it is associated. The dolly hitch is comprised of a parallelogram-type support structure attached to the implement at one side of the support structure and having a wheel support at the other extremity with a motive means connected between two of the parallel arms for elevating the implement with which it is connected. The wheel support structure includes a hitch coupling for attaching additional implements to be towed with the cultivating apparatus. The connection between the motive means and the parallel arms of the support includes a sleeve mounted on one of the arms and a stop structure which permits limited elevation and adjustable elevation of the implement relative to the ground or the wheel support structure.

---

My invention relates to a tandem implement dolly and more particularly to an improved dolly wheel hitch having motive means associated therewith for elevating cultivating apparatus with which it is associated.

Wheeled dollies and hitches of various types have been used in conjunction with drawn cultivating equipment or the equivalent for various purposes. Generally, the dolly wheel hitch is utilized for connecting various units of a working apparatus in a tandem relationship to be drawn simultaneously in working operation. The dolly may serve as the load distribution apparatus and will also provide a fixed hitch point for additional apparatus to be drawn thereby. Generally, however, the complexity of the apparatus for this purpose adds to the cost of the same and is adversely affected when one or more implements being drawn are elevated between working and transporting position. Further, unless the individual pieces of drawn equipment has their own elevating means, the attachment and equipment necessary to elevate the same from the draft means or tractor becomes complicated, expensive and difficult to use.

The present invention in the dolly wheel hitch provides for a simplified structure attached to a piece of cultivating equipment which is to be connected to and drawn by a motive means, such as a tractor, with provision for elevating the equipment to which it is attached. The improved dolly wheel hitch maintains ground contact with its wheel as the equipment is moved from a transporting to a working position, so that the hitch connection on the same to the additional equipment in the tandem relationship will not be effected and the angle at which the additional equipment is drawn remains stable. The improved dolly hitch includes a parallelogram type coupling journaling the dolly wheel on which the hitch connection is mounted with a motive means attached to the coupling for elevating a portion of the coupling and hence the equipment to which it is attached.

Therefore it is an object of this invention to provide an improved dolly wheel hitch.

Another object of this invention is to provide an improved dolly wheel hitch which permits load distribution on the dolly wheel and a laterally flexible hitch between tandem drawn implements.

A further object of this invention is to provide in an improved dolly wheel hitch a power lift for raising the implement with which the hitch is associated between working and transporting positions.

Another object of this invention is to provide an improved dolly wheel hitch having a ground engaging wheel with a short coupling between implements to be connected for stability in turning and operation.

A still further object of this invention is to provide in an improved dolly wheel hitch a simplified construction which is economical to manufacture and maintain.

These and other objects of this invention will become apparent from the reading of the attached description together with the drawings wherein:

FIGURE 1 is a perspective view of the improved dolly wheel hitch with a tractor and a pair of farm implements connected thereto;

FIGURE 2 is a plan view of the improved dolly wheel hitch;

Figure 3:
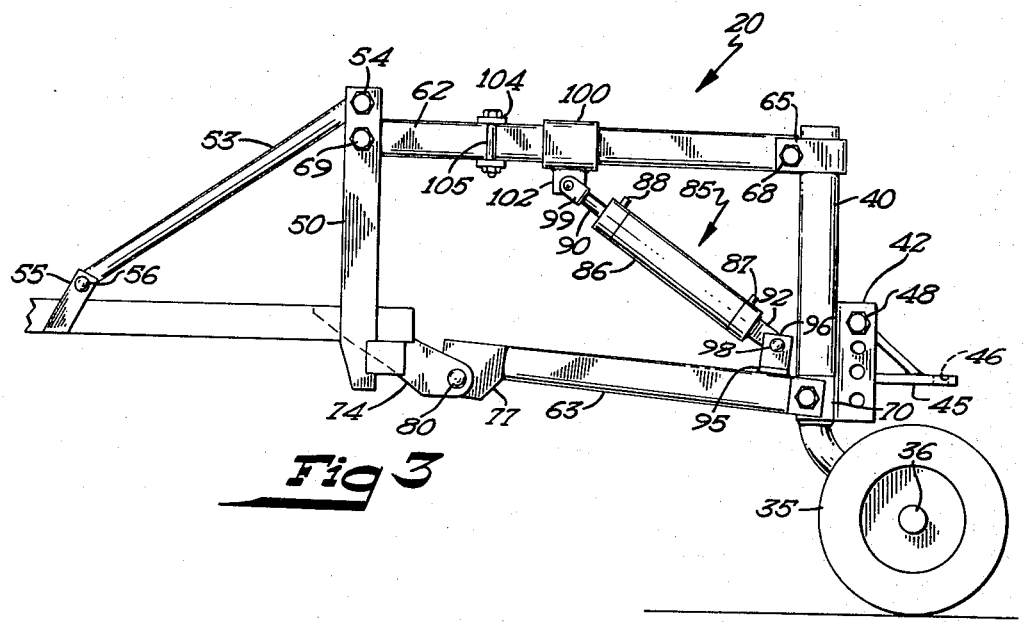
FIGURE 3 is a side elevation view of the improved dolly wheel hitch in a free floating or working position.

My improved dolly wheel hitch is shown in perspective in FIGURE 1, in its normal working relationship with agricultural implements. Thus as will be seen in FIGURE 1, a motive means or tractor 10 is shown in part as connected to a piece of agricultural equipment or cultivating unit, indicated generally at 15, with the improved dolly wheel hitch, indicated generally at 20, being connected at the rear extremity thereof in trailing relationship thereto and providing a hitch coupling for a second piece of agricultural equipment, indicated generally at 25. The latter may take the form of a disc apparatus, planter or equivalent structure sometimes towed behind other cultivating apparatus. The tractor or draft motive means 10 may take any form and will employ a conventional hitch (not shown) to connect thereto the first named piece of cultivating apparatus 15, shown herein as a cultivator. As shown in the drawing, the cultivator is comprised of a frame 30 with a plurality of depending tools 32 connected thereto and this structure may or may not include stabilizing wheels (not shown). Normally a piece of cultivating apparatus of this type, if it does not employ wheels, will be provided with a means in the hitch connection to the tractor or draft motive means to elevate the same for a transporting condition or position. More complex cultivating apparatus, particularly of wheel type, include lift mechanisms associated therewith to raise the working tools thereon and the frame upon which they are mounted with respect to the remaining portion of the apparatus such that it may be transported with the tools clear of the ground.

Figure 4:
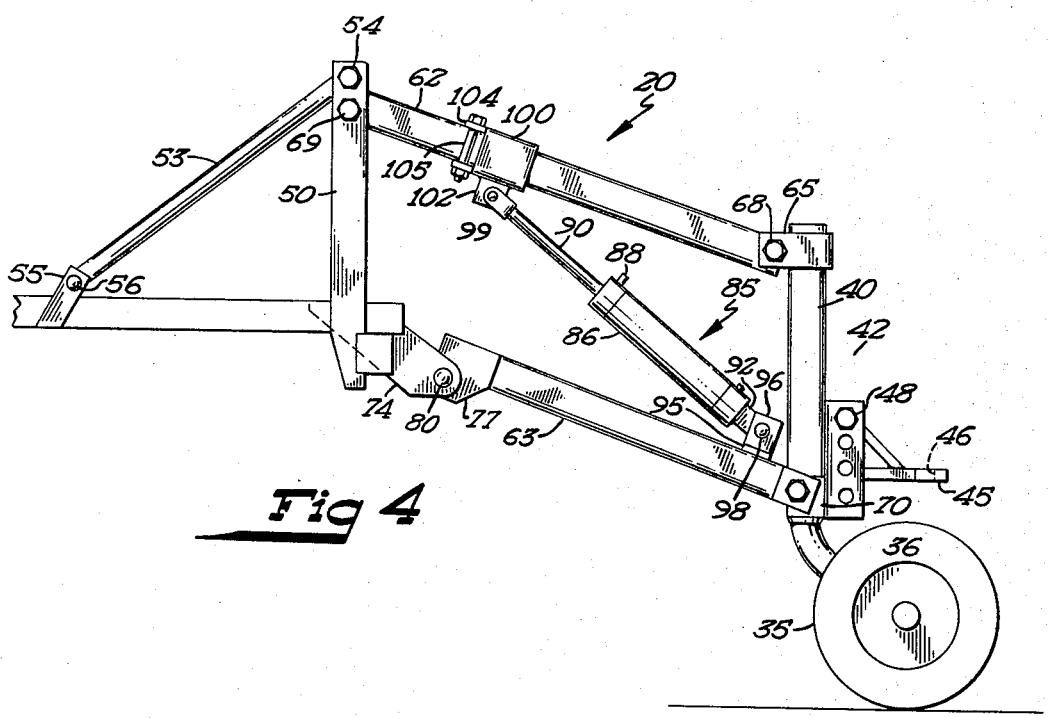
FIGURE 4 is a side elevation view of the improved dolly wheel hitch in a transporting position.

In the present invention, the improved dolly wheel hitch eliminates the necessity of including an elevating mechanism on the tractor to cooperate with the structure thereon and lift the cultivating apparatus between the working and transporting positions. Similarly it is not required that the individual piece of cultivating apparatus have its own elevation means incorporated therewith. This improved dolly wheel hitch utilizes a stabilizing and supporting wheel structure which is shown in plan view in FIGURE 2 and in elevation in FIGURES 3 and 4 in varying operating positions. Thus as will be seen in FIGURE 2, a pair of wheels 35 mounted on a common axle 36 are attached to a supporting shaft 38 and journaled thereon. The shaft 38 is mounted in a cylindrical post member or housing 40 for the hitch with the post member having a pair of flanges 42 mounting a connecting tongue structure 45 with an aperture 46 therein by means of which the second or trailing piece of cultivating apparatus is connected. Flanges 42 include apertures 48 therein by means of which the tongue structure 45 may be elevated with respect to the flanges for varying heights of hitch positions to accommodate varying sizes of equipment. Post 40 which mounts the journal shaft 38 of the wheels 35 forms one leg of a parallelogram type support or coupling, the opposite side of which is a post structure suitably connected to the frame 30 of the first named piece of cultivating apparatus. The upright post is actually a pair of spaced plate members 50 shown in plan in FIGURE 2 which are welded to the frame 30 at the bottom end thereof and supported at the upper extremity by means of a tie bar 52 which is pinned at one extremity between the ends of the plates 50, as at 54, and connected at the other extremity to a bifurcated flange member 55 through a suitable pin 56, the flange member being suitably attached to the frame 30 through means (not shown). The opposite sides of the parallelogram type coupling are comprised of a single upper arm or lever 62 and a pair of levers 63, 64 which form the lower side of the parallelogram. The upper lever or arm 62 is pivotally connected at one extremity to a flange 65 mounted on the post or casing 40 through a pivot pin 68 and the opposite extremity of the arm 62 is positioned between the upright plate members 50 forming the upright member and connected thereto through a pin 69 which extends through the apertures in the plates 50 and through the lever arm structure 62. This connection is located below the pivotal connection 54 of the brace or supporting arm 52. The lower arms 63, 64 forming the lower sides of the parallelogram type coupling will best be seen in the plan view of FIGURE 2 in which each of the arms 63, 64 are pivotally mounted on the flanges 70 attached or suitably connected to the casing 40 and pivoted thereon through pins 72. The opposite extremities of the arms 63, 64 are connected to a pair of spaced flange plates 74, 75 connected to spaced portions or members on the frame 30 through suitable means such as welding, the extremities of the flanges having apertures 76 therein which align with the similar apertures in platelike extremities 77, 78 of the arms 63, 64. Suitable pin means 80 extend through these apertures to pivotally connect the arms 63, 64 to the flanges 74, 75 to support these extremities of the arms in spaced relation on the frame of the forward cultivating apparatus.

With this parallelogram configuration, the frame 30 of the cultivating apparatus 15 with the tools 32 thereon may be elevated from a working to a transporting position raising the upright structure or plates 50 and hence one side of the coupling while the casing 40 and wheel supporting shaft 38 are maintained vertical and in a fixed relation relative thereto. Such movement of the members is in a parallel relationship permitted by the pivoted side structures 62, 63 and 64 respectively. With the improved dolly hitch, a conventional piece of cultivating apparatus may be so modified with the depending flanges 74, 75, the upright plates 50 and the supporting tie rod 52 to permanently connect this portion of the hitch thereto. With this configuration, the hitch will permit elevation of the frame 30 of the forward cultivating apparatus through a hydraulic actuator or lifting motor indicated at 85. The motor 85 is comprised of a cylinder 86 having fluid pressure lines 87, 88 connected at the extremities thereof and an operating shaft 90 extending therefrom. The closed end of the cylinder mounts a connecting flange 92 which is pivoted on a transversely extending plate 95 connected to the arms 63, 64 and extending therebetween. Plate 95 is attached to the arm 63, 64 through suitable means such as welding (not shown) and an upstanding bifurcated flange structure 96 fits around the projecting flange 92 and is pinned thereto through suitable pin means 98 to pivotally mount the end of the cylinder thereon. The shaft extremity of the cylinder mounts a coupling 99 which is connected to a sleeve 100 at a flange 102 thereon, the sleeve 100 being slidably mounted on the upper arm 62. A suitable stop structure in the form of a pair of plates 104 connected to the arms through suitable bolt and nut means 105 limits the travel of the sleeve 100 in one direction such that operation of the hydraulic cylinder and extension of the shaft 90 therefrom will cause the upright plate side 50 and the coupling to be elevated raising the frame 30 of the cultivating apparatus. The pivotal connection between the coupling 99 and the flange 102 of the sleeve 100 permits retraction of the shaft within the confines of the cylinder for one direction of fluid flow through the pressure conduits 87, 88 and lifting operation of the actuator 85 when such fluid is reversed in the conduits. With this structure, the lifting takes place only over a portion of the movement of the shaft near the extreme of travel which distance is sufficient to elevate the hitch between the working and transporting position of the cultivating apparatus 15. It will be noted that the dolly wheel hitch will remain in contact with the ground supporting the cultivating apparatus in both the trailing or working and elevated position. The hitch 45 connected thereto by means of which the second piece of cultivating apparatus 25 or the equivalent is towed behind the first and will thus be connected to a fixed point with respect to the ground even though the forward piece of cultivating apparatus is in an elevated position. Under these conditions the dolly wheels will support the first named piece of cultivating apparatus in an elevated position and still provide a hitch connection to the second named piece of cultivating apparatus to be drawn by the tractor in the trailing and tandem relationship. Thus as will be seen in FIGURES 3 and 4, the dolly wheel hitch is moved from a lowered or working position to an elevated position to effect a raising of the first cultivating apparatus directly connected to the tractor without effecting a location or coupling between the hitch and the trailing piece of cultivating apparatus. This will insure efficiency and proper trailing of the equipment for improved working of the same. Similarly the dolly wheel hitch will permit proper trailing of the equipment over an uneven terrain since the parallelogram type coupling will permit relative movement. In the working position, the rest position of the actuator will support the parallelogram type coupling to prevent the first named piece of cultivating apparatus from going beyond a predetermined reference position. In this sense it supports the first named piece of cultivating apparatus.

This simplified structure permits the location of the elevating apparatus for the first named piece of cultivating apparatus in a location which is simple to operate and maintain. Further, it permits an elevating apparatus to be added to conventional cultivating equipment which does not include its own elevating structure through the use of a simplified hydraulic actuator normally available with tractor motive equipment to be operated from the hydraulic system of the same.

In considering this invention it should be remembered that the present disclosure is intended to be illustrative only and the scope of the invention should be determined by the appended claims.

What is claimed is:

1. A dolly wheel hitch for supporting the rear end of a piece of cultivating apparatus adapted to be pivotally connected to a draft means and moved vertically between working and transporting positions, comprising, a shaft having wheel means journaled thereon, a post journaling said shaft, a second post adapted to be rigidly mounted on the cultivating apparatus in spaced parallel relation with the first post in a substantially vertical position, a pair of lever means pivotally mounted at each of their extremities on the first and second named posts to form a parallelogram type mounting connecting the shaft having the wheel means thereon to the end of the cultivating apparatus, a linear motive means including a pair of relatively movable parts connected between the pair of lever means forming the opposite sides of the parallelogram type mounting of a shaft to move the second named post and the end of the cultivating apparatus in a vertical direction between working and transporting positions with operation of said linear motive means, and adjustable flange means mounted on the first named post means and adapted to be connected to a second piece of argricultural equipment to be drawn with the first named piece of cultivating equipment by said draft means with said wheel means of the dolly being continuously on the ground, one of the relatively movable parts of the linear motive means including a sleeve mounted on one of the pair of pivoted lever means and a flange coupled thereto and pivotally mounted thereon and a stop means on said one of said pivoted lever means to be engaged by said sleeve.

2. A dolly wheel hitch for supporting a piece of towed agricultural equipment and providing a hitch for a second piece of equipment to be towed in tandem relation therewith comprising, a parallogram-type system having a pair of spaced parallel members one of which carries wheel means journaled thereon and the other of which is adapted to be connected to the first named towed piece of agricultural equipment, said lever system including a pair of levers pivotally connected at their extremities on the spaced parallel members, one of the levers having a sleeve mounted thereon and a stop affixed thereto, and motive means including a movable and a fixed part connected between the levers of the parallelogram-type lever system to move the other of the spaced parallel members in a vertical direction as one of said spaced parallel members rides on the ground with operation of the motor means, said movable part of the motor means being connected to the sleeve to urge said one of said levers and hence the other of said spaced parallel members in the vertical direction.

3. The dolly wheel hitch of claim 2 and including an adjustable flange mounted on said one of said spaced parallel members to connect to the second piece of equipment to be towed in tandem relationship with the connection between the flange and the second piece of equipment being unaffected by operation of said motive means.

References Cited
UNITED STATES PATENTS

| | | | |
|---|---|---|---|
| 1,107,460 | 8/1914 | Steele | 172—417 X |
| 2,037,738 | 4/1936 | Porter et al. | 172—386 |
| 2,764,075 | 9/1956 | Fowler | 172—328 |
| 3,266,181 | 8/1966 | Olafson | 172—316 X |

OTHER REFERENCES
German Printed Specification No. 1,029,849, May 1958.

ABRAHAM G. STONE, *Primary Examiner.*

J. R. OAKS, *Assistant Examiner.*